United States Patent [19]
Bourquardez et al.

[11] 3,762,834
[45] Oct. 2, 1973

[54] HELICOPTER ROTORS COMPRISING A REINFORCED PLASTICS HUB

[75] Inventors: Gaston Bourquardez, Aix-en-Provence; Michel Jean Yves Gouzien, Bouc Bel Air; René Mercier, Aix-en-Provence, all of France

[73] Assignee: Societe Nationale Industrielle Aerospatiale, Paris, France

[22] Filed: Feb. 2, 1972

[21] Appl. No.: 222,871

[30] Foreign Application Priority Data
Feb. 15, 1971 France .............................. 7104967

[52] U.S. Cl. ................. 416/134, 416/140, 416/141, 416/230
[51] Int. Cl. ............................................. B64c 11/12
[58] Field of Search ................... 416/134, 135, 138, 416/140, 141, 106, 107, 230, 241

[56] References Cited
UNITED STATES PATENTS

| | | | |
|---|---|---|---|
| 3,026,942 | 3/1962 | Cresap .......................... | 416/135 UX |
| 3,280,918 | 10/1966 | Drees et al. .................. | 416/135 UX |
| 3,384,185 | 5/1968 | Fernandez..................... | 416/134 UX |
| 3,610,774 | 10/1971 | Mouille.......................... | 416/138 X |
| 3,669,566 | 6/1972 | Bourquardez et al. ............. | 416/134 |

FOREIGN PATENTS OR APPLICATIONS

| | | | |
|---|---|---|---|
| 1,334,446 | 7/1963 | France................................ | 416/134 |

*Primary Examiner*—Everette A. Powell, Jr.
*Attorney*—Karl W. Flocks

[57] ABSTRACT

A helicopter rotor has a reinforced plastics hub. Arms extend radially outwardly from the hub each arm carrying through, the intermediary of a sleeve, a blade. The arms are reinforced with fibres.

10 Claims, 5 Drawing Figures

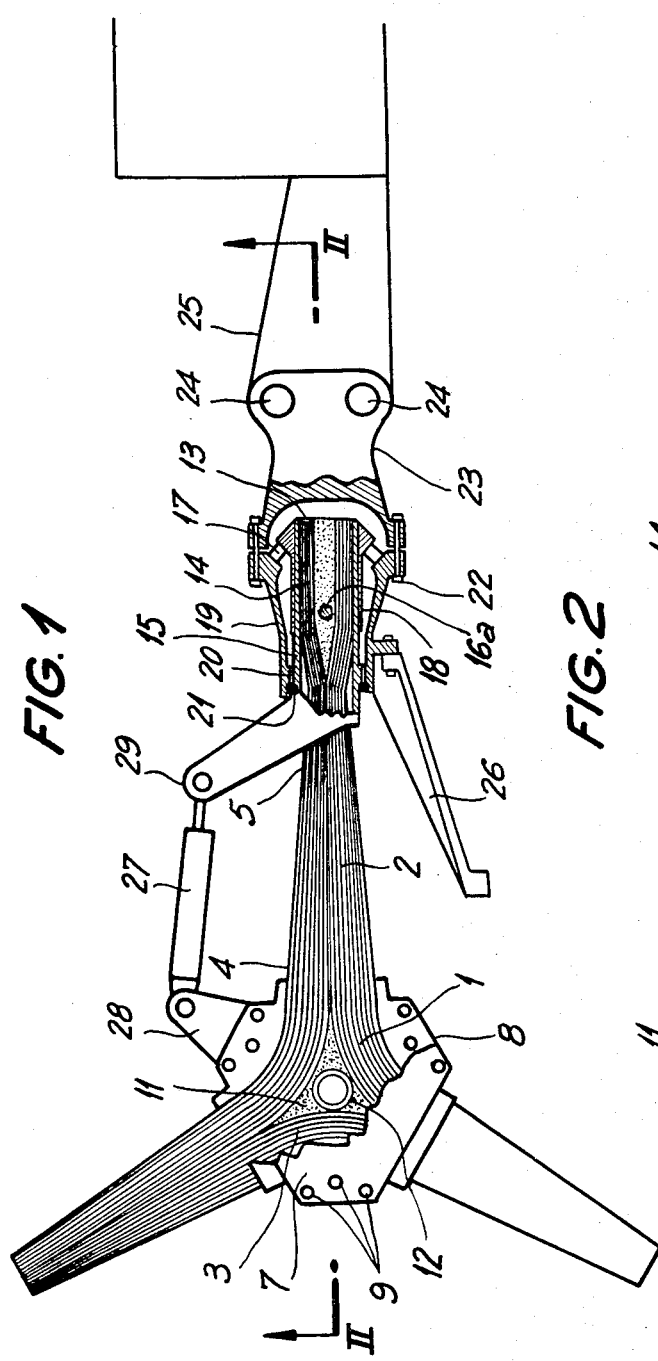
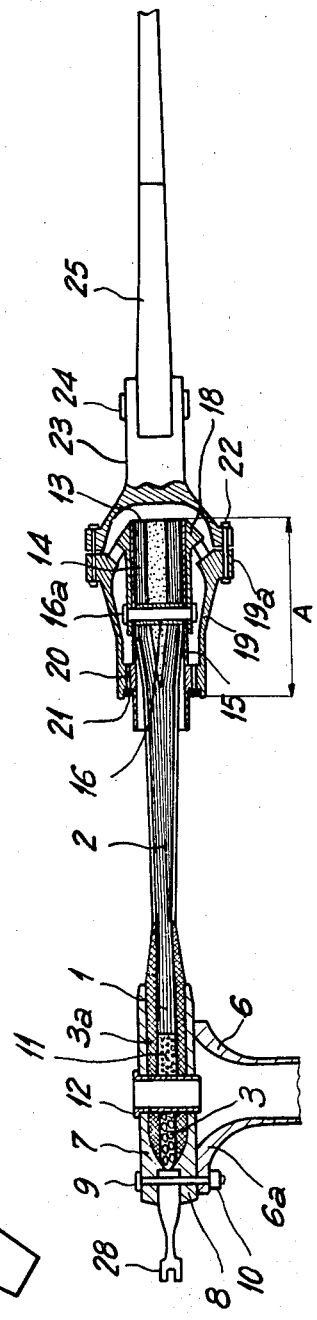

HELICOPTER ROTORS COMPRISING A REINFORCED PLASTICS HUB

This invention relates to a helicopter rotor comprising a reinforced plastics hub enabling oscillatory movements of the blades in the plane of rotor rotation, such oscillations being known as drag oscillations, and blade movements in planes perpendicular to the plane of rotor rotation, the latter movements being known as beat movements, to be produced by static and dynamic bending of the reinforced plastics hub material, whereas blade rotations around their longitudinal axis, such rotations being known as pitch movements and serving to change the angle of blade incidence, are produced through the agency of an articulation which is provided between each blade and the flexible portion of the hub and which enables the blade to rotate around its longitudinal axis.

Helicopter rotors devoid of beat and drag articulation are known, the blades of such rotors being mounted in a rigid hub by way of a pitch variation bearing providing merely blade pitch variation. Of course, for such rotors to operate satisfactorily, either resilient intermediate members enabling each blade to perform the requisite beat and drag movements must be interposed between the rigid rotor head and the blade itself or the blades must be made of a glass-fibre reinforced plastics imparting some flexibility to the blades for beat and drag purposes; also, and as French Pat. No. 1,595,587 discloses, blades of this kind can comprise a neck-like footing or root part serving more particularly for adjustment of the natural beat and drag frequency of the rotating blades.

Rotors of this kind have a number of severe disadvantages, more particularly at high speeds of travel; the flexible elements are fairly far away from the hub centre, with the result that unstabilising torques may be produced when the rotor disc is tilted by a gust of wind. Placing the pitch articulation forwards of the flexible elements of the blade introduces interfering incidence variations due to coupling between beat and drag deformations. Such pitch variations may cause extreme fore and aft pitching instability at high speeds and be the cause of high vibratory excitations.

The invention obviates these disadvantages.

According to an important feature of this invention, the hub comprises arms which are provided to the same number as there are blades and which are reinforced with substantially radial high-mechanical strength fibre groups whose cross-section near the hub is flat in the rotor plane, such cross-section merging into a substantially radial cylindrical portion, the same bearing a sleeve on which an annular member rigidly secured to each blade by appropriate securing means rotates.

Preferably, the centrifugal force acting on the blade is in known manner borne by an elongated straight element secured to the blade and to the arm and adapted to withstand longitudinal tension but adapted to twist.

Advantageously, the elongated element takes the form of a group of glass fibres which are coaxial of the cylindrical portion. Preferably, the group of fibres is integral with the hub framework and forms the terminal portion of a group incorporated in such framework. There is therefore no need for anything to be secured to the hub, securing to the blade being by means of the shaping of the blade outer end.

Preferably, the axial group or bunch is cylindrical and enveloped in a vulcanized elastomer; it can be separated from the remainder of the hub by a plastics anti-friction sleeve, e.g., of polytetrafluoroethylene.

To reduce flight vibrations known as "air resonance" and to limit drag torques when the drag resonance is passed through a take-off and at stoppage of the rotor, the hub comprises, with advantage drag dampers whose operative movement can be small, since the movements of the flexible arms of the hub are relatively small.

Since the central portion of the moulded hub is contained in a metal casing, the drag dampers can be disposed between securing points secured to the sleeves borne by the cylindrical portions of the arms and to the casing in the space between two consecutive blades.

As compared with articulated metal blades, the hub according to the invention, which operates similarly to such hubs, is very simple, and so, taken together with the reduced number of delicate parts required, including rolling bearings and metal parts working in fatigue conditions, overall reliability is improved, weight and cost are reduced and maintenance greatly simplified. Also, using glass fibres gives the hub very great fatigue strength, plus a safety advantage in that damage occurs progressively and never abruptly and is accompanied by delamination which is visible for a very long time before final rupture.

A useful feature of the hub according to the invention is that it can be associated with a wide variety of blades, e.g., with metal or reinforced plastics blades.

Also, an advantage which the rotor according to the invention has over rotors which are devoid of beat and drag articulations and where the necessary flexibility is in the actual blades, more particularly at their root, is that a rotor having a hub according to the invention can have flexible beat elements nearer the centre of the hub, thus providing a strong stabilising effect on the rotor, more particularly in wind gusts.

The angle of blade incidence of such a rotor is not affected by hub beat and drag deflections, since the pitch articulation is interposed between each blade and the deformable element of the hub. This feature obviates the pitching instability and high vibratory excitation from which helicopters having flexible blades suffer when travelling fast.

The accompanying drawings show how the invention can be carried into practice.

In the Drawings:

FIG. 1 is a plan view, with parts removed, of a first embodiment of the invention;

FIG. 2 is a section on the line II — II of FIG. 1;

Figure 3:
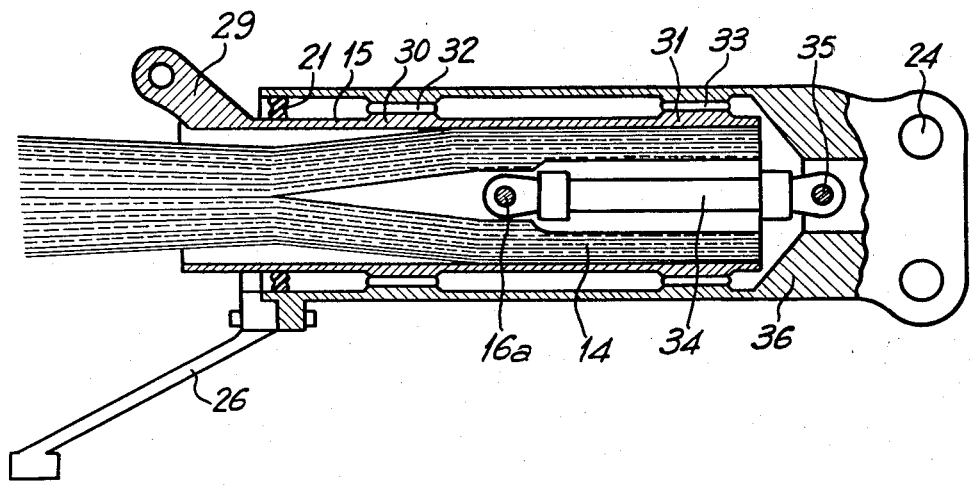
FIG. 3 is a section similar to FIG. 2 through an alternative form of the elements disposed between the blade and the flexible arm.

The hub shown in FIGS. 1 and 2 mainly comprises a central portion 1 made of high-strength fibres, e.g., of glass, impregnated with synthetic resin and arranged star-fashion to form around the axis of rotor rotation as many flexible arms 2 as the rotor has blades. To form the arms, the fibres, which are continuous from any arm to the next and which are curvilinear in the central portion 3, are so disposed that, without any change in superficial area, the cross-section of each arm gradually changes from a substantially oval shape in root zone 4, with the flattened zone extending perpendicularly to the hub axis, into a circular shape at end 5.

Preferably, the central portion 3 is reinforced by a covering 3a in the form of a number of layers of resin-impregnated glass cloth so as to form the hub body and enable the hub to be secured to the top of shaft 6, which flares out to form a collar 6a, through the agency of two metal partial shells 7, 8 which encase the central portion 3 and which are rigidly secured to one another and to collar 6a through the agency of screw-threaded spindles 9 retained by nuts 10 disposed between the arms.

In the central stellate space left free by the fibre groups extending between consecutive arms a rigid plastics filling 11 is provided around a bush or the like 12 which is used to enable a tool to be positioned or for electric wiring.

Preferably, the circular portion 5 is thickened and strengthened over a length A at each arm end by the introduction of glass cloth members 13 between the glass fibre layers. The resulting terminal portion 14 is then mechanically strong enough to withstand stressing in all directions. Disposed in the central space of the circular portion 5 is a rigid plastics filling identical to what is used in the central internal portion of the hub body.

The portion 14 receives the connecting means between the arm and the blade root, such means providing a transfer into the arm of the forces and moments produced by the rotating blade (beat, drag, centrifugal forces) — and a pitch articulation which, under the control of an appropriate control lever, enables the pitch of each blade to be varied by pivotting around the geometric axis of the portion 14. To this end, the same is drilled after polymerisation. A metal ring 16 is introduced into the aperture and centred by an appropriate tool, and in a single working step the ring 16 and a steel outer cylindrical bush or the like 15, which extends right around the portion 14 and thus can transmit transverse forces and moments, are stuck on. The longitudinal centrifugal tension is applied to ring 16 by way of a steel spindle or shaft 16a extending therethrough, the ring 16 compressing the portion 14 so that the same operates in shear stress.

The pitch articulation can take the form e.g. of a rolling-bearing type abutment 17 interposed between a hoop or collar or the like 18 slid into sleeve 15 and retained by spindle 16a — the end of the hoop forming the inner raceway for the rollers 17 — and a sleeve 19 whose end forms the outer raceway. Through the agency of a plain or needle bearing 20, sleeve 19 also rotates on the extension of bush 15, with sealing tightness between the same and the sleeve 19 provided by a gasket 21. The complete bearing 20 is lubricated either with grease or by oil immersion and comprises appropriate lubrication nipples.

On the side near blade 25, sleeve 19 has a collar 19a for the securing, by means of a ring of nut-and-bolt connections 22, a blade brace or the like 23 terminating in a double yoke which, through the agency of two spindles or pins or the like 24, serves to retain blade 25.

Secured to the inside of sleeve 19 by nuts and bolts is a lever 26 which is connected to the helicopter control system for blade pitch variation purposes.

In this construction, centrifugal force acting on the blade is transmitted to the arm 2 by the conical abutment comprising the rollers 17.

A known kind of short-travel drag damper 27 is disposed between, on the one hand, the central hub part, by way of a brace or the like 28 secured to the partial shell members 7, 8 through the agency of spindles or the like 9, and, on the other hand, to the end of each flexible arm by way of a lever 29, which extends and is secured to the member 15.

FIG. 3 shows an alternative form of connection between the end of the flexible arm and the blade brace. In this construction the stationary bush 15 comprises two inner raceways 30, 31 for two needle bearings 32, 33; a brace 36 (which has, on the side near the blade, a yoke receiving the two members 24) is shaped, on the side near the hub centre, as a cylindrical member extending around the member 15 and forming outer raceways for the needles 32, 33. A pitch control lever 26 is secured by screw-threaded fastenings to the end of the cylindrical portion which extends around the member 15. Disposed between the brace 36 and the cylindrical portion 14 is a known kind of twistable element 34 such as a bunch of steel strips or an element of wound steel wires. Such element is received inside portion 14 and is adapted to transmit centrifugal force while allowing the blade to rotate relatively to the hub. Element 34 is retained by a pin or spindle or the like 35 in a recess in member 36 and is retained on the end of the flexible arm by spindle or pin or the like 16a. Advantageously, the element 34 is embodied as a bunch of very strong fibres covered in flexible elastomer and built into the arm at manufacture thereof. This suggestion helps to reduce the cost of the hub by removing the usually very costly external elements required to deal with centrifugal forces, as well as reducing overall weight by using lightweight glass-elastomer laminates instead of parts made of metal more particularly steel.

Figure 5:
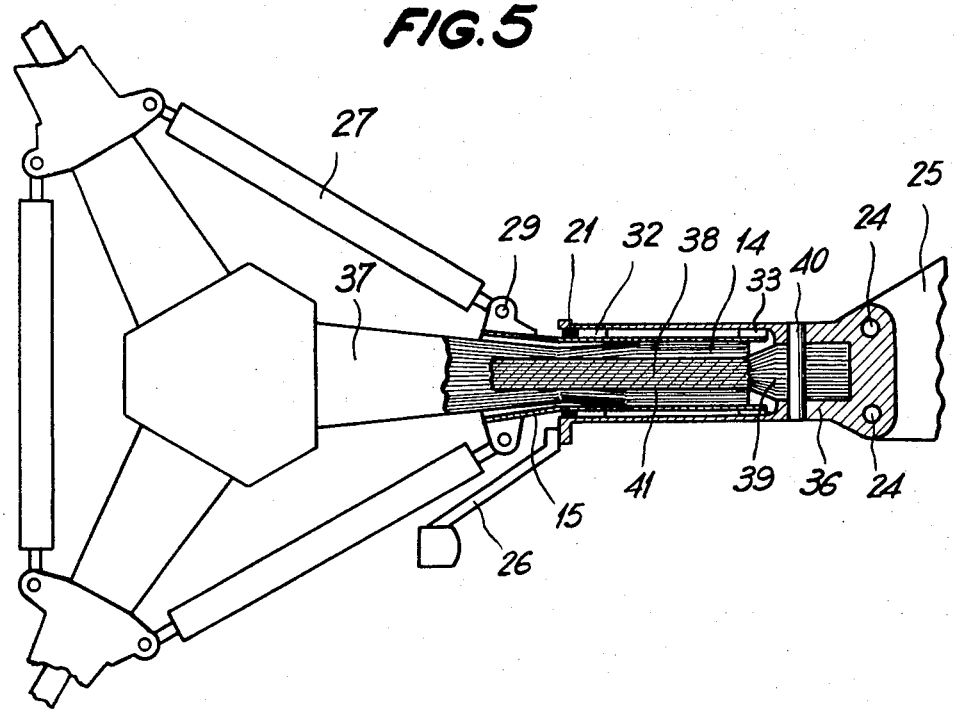
FIG. 5 is a view in horizontal section of another constructional variant.
Figure 4:
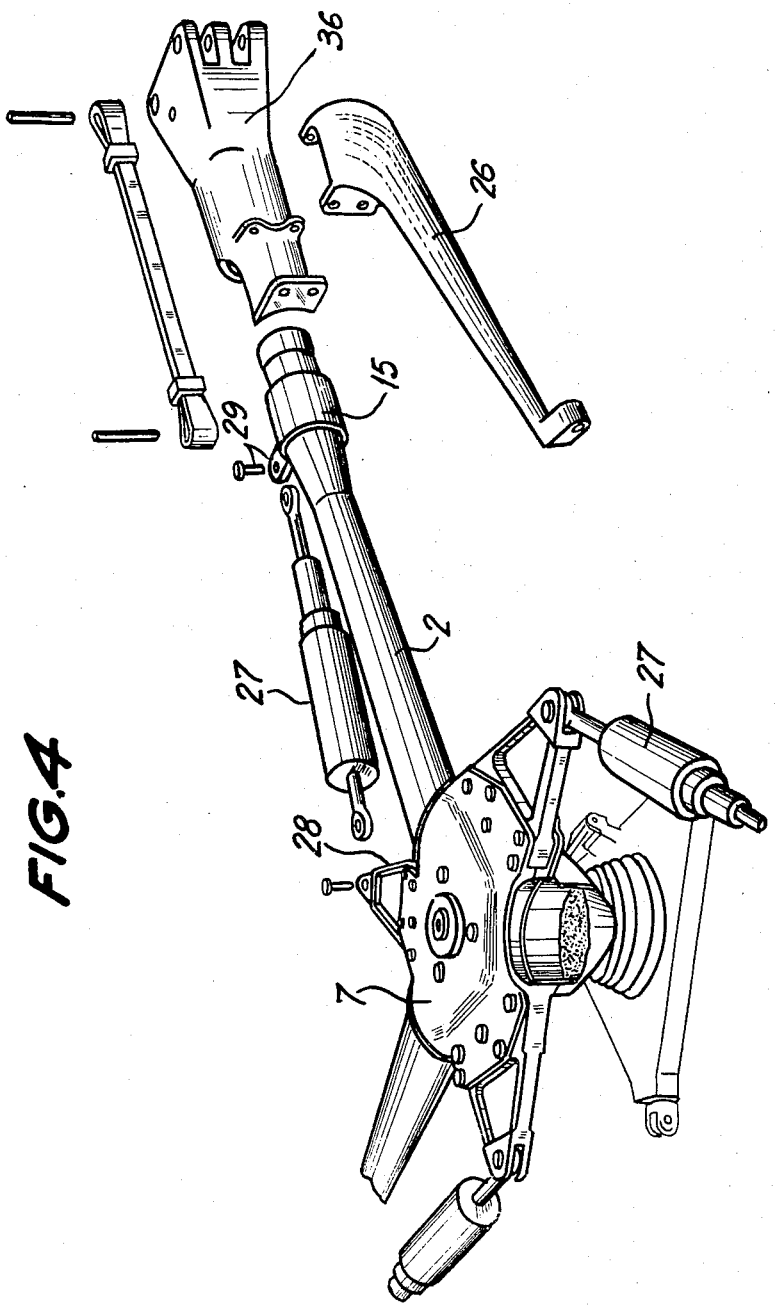
FIG. 4 is an exploded perspective view of a hub embodiment of the kind shown in FIG. 3.

The variant shown in FIG. 5 shows how the strut or the like which has to withstand centrifugal force can be embodied as a bunch of strong fibres impregnated with flexible vulcanized elastomer, such bunch or group forming part of the glass fibre framework of the hub.

In this case, a portion 37 of hub-reinforcing fibres is shaped to form a cylinder 38 coaxial of the cylindrical portion 14 and impregnated with flexible vulcanized elastomer. The outer free end 39 of cylinder 38 is impregnated with a strong polymerisable synthetic resin to form a connecting element for the blade 25. As shown, a head through which a pin or the like 40 providing a connection to the blade extends can be provided in this way.

If required, the same end can be shaped as a conical head which engages in a recess in blade 25.

The cylindrical portion 38 which forms a torsion element can be of a length equal to half the total length of the arm 2. Preferably, portion 38 is disposed beyond that part of arm 2 which is near the hub and which experiences bending due to beating and drag. Advantageously too, portion 38 is included, at least mostly, in the member 15 forming a bearing for the blade.

Twist deformation of the cylindrical portion 38 is assisted by a teflon sheath 41.

To construct a hub of this kind, the cylindrical portions 38 are manufactured first and covered with their teflon sheath, whereafter the complete hub with its glass fibre framework comprising the cylindrical portions 38 is moulded after impregnation with a resin.

In the embodiment shown in FIG. 5 the drag dampers 27 are secured at both their ends to lugs 29 on members 15.

The invention is of use for all helicopters comprising one or more lift rotors.

We claim:

1. A rotor construction comprising a one-piece star-shaped moulded rotor hub substantially made of bundles of mineral filaments agglomerated by a polymerized synthetic resin, each bundle extending from the end of one star arm to the end of the next one, each star arm having near the hub axis, in the star plane, a flattened cross-section merging into a cylindrical substantially radial end portion; a sleeve, surrounding each said cylindrical portion and secured thereto, having at least a lateral lug at the end directed towards the hub axis; an elongated drag damper in said star plane, one end of which is secured to said lug and the other to the hub towards one of the next star arm; a blade having a bushing engaging each said sleeve; roller means between said bushing and sleeve and means adapted to withstand centrifugal force for securing said blade to said arm.

2. The improved rotor of claim 1 wherein the said end cylindrical portion is thickened by the inclusion of shapes in strong fibre cloths coaxially of the group of axial fibres of the cylindrical portion.

3. The improved rotor of claim 1, wherein said means to withstand centrifugal force is a straight element which withstands tension but which can twist and which is disposed axially in the cylindrical portion and whose ends are secured, on either side of the cylindrical portion which bears the sleeve, to the arm and to the blade.

4. The improved rotor of claim 1, wherein one of the two ends of said drag damper is secured to a casing containing the central part of the hub in the gap between two blades.

5. The improved rotor of claim 2, wherein said means to withstand centrifugal force is a straight element embodied by a group of strong fibres encased in a flexible vulcanized elastomer.

6. The improved rotor of claim 5, wherein the group is a terminal portion of the hub-reinforcing fibre groups.

7. The improved rotor of claim 5, wherein the fibre group is isolated from the cylindrical portion by a flexible antifriction plastics sheath.

8. The improved rotor of claim 6, wherein the outer end of the group is encased in hardened synthetic resin and shaped for connection to the blade.

9. The improved rotor of claim 6, wherein the terminal part of the group has a length substantially equal to half the total length of the arm.

10. The improved rotor of claim 6, wherein the terminal part of the group extends mainly in the arm part comprising the cylindrical portion around which the sleeve extends.

* * * * *